(12) United States Patent
O'Baid et al.

(10) Patent No.: US 6,880,335 B2
(45) Date of Patent: Apr. 19, 2005

(54) STIRLING CYCLE CRYOCOOLER WITH IMPROVED MAGNET RING ASSEMBLY AND GAS BEARINGS

(75) Inventors: Amr Hassan O'Baid, Goleta, CA (US); Wallace Y. Kunimoto, Santa Barbara, CA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 0 days.

(21) Appl. No.: 10/767,110

(22) Filed: Jan. 28, 2004

(65) Prior Publication Data

US 2004/0182077 A1 Sep. 23, 2004

Related U.S. Application Data

(63) Continuation of application No. 10/160,570, filed on May 30, 2002, now Pat. No. 6,694,730.

(51) Int. Cl.⁷ ............................................. F01B 29/10
(52) U.S. Cl. ............................. 60/517; 60/520; 60/524; 92/181 R; 92/181 P
(58) Field of Search .......................... 60/517, 520, 524, 60/526; 92/181 R, 181 P

(56) References Cited

U.S. PATENT DOCUMENTS

| | | | |
|---|---|---|---|
| 3,062,509 A | 11/1962 | Mulder | |
| 3,273,356 A | 9/1966 | Hoffman | |
| 3,282,064 A | 11/1966 | Cowans et al. | |
| 3,456,718 A | 7/1969 | De Fries | |
| 3,736,761 A | 6/1973 | Richmond et al. | |
| 3,774,405 A | 11/1973 | Leo | |
| 3,991,585 A | 11/1976 | Mulder | |
| 4,078,389 A | 3/1978 | Bamberg | |
| 4,079,595 A | 3/1978 | Kroebig | |
| 4,138,847 A | 2/1979 | Hill | |
| 4,359,872 A | 11/1982 | Goldowsky | |
| 4,379,598 A | 4/1983 | Goldowsky | |
| 4,387,762 A | 6/1983 | Rinderle | |
| 4,389,849 A | 6/1983 | Beggs et al. | |
| 4,458,489 A | 7/1984 | Walsh | |
| 4,545,209 A | 10/1985 | Young | |
| 4,610,143 A | 9/1986 | Stolfi et al. | |
| 4,722,188 A | 2/1988 | Otters | |

(Continued)

FOREIGN PATENT DOCUMENTS

| | | |
|---|---|---|
| WO | WO 99/60709 A1 | 11/1999 |
| WO | WO 00/14469 A1 | 3/2000 |
| WO | WO 02/11930 A1 | 12/2002 |

OTHER PUBLICATIONS

Basiulis, "Designer's Guide To Heat Pipes", Design News, Mar. 18, 1974, 158–159.

Scharen et al., "Filter Subsystems For Wireless Communications", IEEE Transactions On Applied Superconductivity, Jun. 1997, 3744–3749.

Hughes Electron Dynamic Division, "Thermal Control With Heat Pipes", Jul. 1981.

*Primary Examiner*—Hoang Nguyen
(74) *Attorney, Agent, or Firm*—O'Melveny & Myers LLP

(57) ABSTRACT

A piston assembly for use in a motor comprises a cylinder having a bore, an electrically conductive piston reciprocally disposed within the cylinder bore, a gas cavity formed within the piston, and one or more gas bearings associated with the piston, each of the one or more gas bearings including an aperture formed within the piston and an electrically conductive tubular member extending through the aperture, the tubular member having a lumen in communication between the gas cavity and the cylinder bore. The piston assembly may be used in connection with a motor used in a cryocooler that is driven by oscillating magnetic energy fields.

48 Claims, 7 Drawing Sheets

U.S. PATENT DOCUMENTS

| | | | |
|---|---|---|---|
| 4,791,634 A | 12/1988 | Miyake | |
| 4,798,238 A | 1/1989 | Ghiraldi | |
| 4,846,861 A | 7/1989 | Berry et al. | |
| 4,924,675 A | 5/1990 | Higham | |
| 4,963,833 A | 10/1990 | Mountz | |
| 4,987,329 A | 1/1991 | Schmidt et al. | |
| 5,040,372 A | 8/1991 | Higham | |
| 5,088,288 A | 2/1992 | Katagishi et al. | |
| 5,140,905 A * | 8/1992 | Dhar | 92/82 |
| 5,385,010 A | 1/1995 | Horn | |
| 5,412,951 A | 5/1995 | Wu | |
| 5,642,088 A | 6/1997 | Unger | |
| 5,642,623 A | 7/1997 | Hiresaki et al. | |
| 5,647,217 A * | 7/1997 | Penswick et al. | 62/6 |
| 5,670,836 A | 9/1997 | Horst | |
| 5,782,084 A | 7/1998 | Jarvis | |
| 5,811,816 A | 9/1998 | Gallagher et al. | |
| 5,842,514 A | 12/1998 | Zapach et al. | |
| 5,884,693 A | 3/1999 | Austin et al. | |
| 5,966,253 A | 10/1999 | Tanaka et al. | |
| 6,024,165 A | 2/2000 | Melane et al. | |
| 6,084,772 A | 7/2000 | Pell et al. | |
| 6,112,526 A | 9/2000 | Chase | |
| 6,141,971 A * | 11/2000 | Hanes | 62/6 |
| 6,263,215 B1 | 7/2001 | Patton et al. | |
| 6,310,772 B1 | 10/2001 | Hutchinson | |
| 6,311,498 B1 | 11/2001 | Chase | |
| 6,327,862 B1 | 12/2001 | Hanes | |
| 6,404,637 B1 | 6/2002 | Hutchinson | |
| 6,427,450 B1 | 8/2002 | Hanes | |
| 6,430,044 B1 | 8/2002 | Hutchinson | |
| 6,462,448 B1 | 10/2002 | Du | |
| 6,474,075 B1 | 11/2002 | Tanaka et al. | |
| 6,475,935 B1 | 11/2002 | Ishizaki et al. | |
| 6,499,304 B1 | 12/2002 | Chase et al. | |
| 6,507,494 B1 | 1/2003 | Hutchinson | |
| 6,514,095 B1 | 2/2003 | Smith et al. | |
| 6,522,041 B1 | 2/2003 | Verbrugge | |
| 6,522,042 B1 | 2/2003 | Du et al. | |
| 6,611,426 B1 | 8/2003 | Hutchinson | |
| 6,684,637 B1 * | 2/2004 | Beale | 60/526 |
| 6,694,730 B1 * | 2/2004 | O'Baid et al. | 60/520 |
| 2002/0139510 A1 | 10/2002 | Ishizaki | |
| 2003/0000226 A1 | 1/2003 | Amano | |
| 2003/0092577 A1 | 5/2003 | Hey-Shipton | |

\* cited by examiner

STIRLING CYCLE CRYOCOOLER WITH IMPROVED MAGNET RING ASSEMBLY AND GAS BEARINGS

RELATED APPLICATION

This application is a continuation of U.S. application Ser. No. 10/160,570, filed May 30, 2002, now U.S. Pat. No. 6,694,730. The '570 application is incorporated by reference as if set forth fully herein.

FIELD OF THE INVENTION

The field of the invention relates generally to cryocoolers, and more particularly to Stirling cycle cryocoolers.

BACKGROUND OF THE INVENTION

Recently, substantial attention has been directed to the field of superconductors and to systems and methods for using such products. Substantial attention also has been to directed to systems and methods for providing a cold environment (e.g., 77 K or lower) within which superconductor products such as superconducting filter systems may function.

One device that has been widely used to produce a cold environment within which superconductor devices may function is the Stirling cycle refrigeration unit or Stirling cycle cryocooler. Such devices typically comprise a displacer unit and a compressor unit, wherein the two units are in fluid communication and are driven by one or more linear or rotary motors. Conventional displacer units generally have a "cold" end and a "hot" end, the warm end being in fluid communication with the compressor unit. Displacer units generally include a displacer having a regenerator mounted therein for displacing a fluid, such as helium, from one end, i.e., the cold end of the displacer unit, to the other end, i.e., the warm end, of the displacer unit. A piston assembly of the motor functions to apply additional pressure to the fluid when the fluid is located substantially within the warm end of the displacer unit, and to relieve pressure from the fluid when the fluid is located substantially within the cold end of the displacer unit. In typical cryocoolers, the piston and displacer units oscillate at 60 Hz. In this fashion, the cold end of the displacer unit may be maintained, for example, at 77 K, while the warm end of the displacer unit is maintained, for example, at 15 degrees above ambient temperature. Devices such as superconducting filters are then typically placed in thermal contact with the cold end of the displacer unit via a heat acceptor. Heat is transferred from the device to the heat acceptor. The heat transferred to the heat acceptor then passes to the helium gas contained in the displacer unit.

A typical motor used in a cryocooler comprises a piston assembly on which there is mounted a magnet ring assembly that transforms an oscillating magnetic energy field generated by motor coils to reciprocating mechanical energy that is applied to the piston assembly. For example, FIGS. 1 and 2 illustrate a prior art piston/magnet assembly 10, which includes a piston assembly 12 and a magnet ring assembly 14 mounted thereon. Referring specifically to FIGS. 3–6, the magnet ring assembly 14 includes eight magnets 16 that are cylindrically arranged to provide a radial magnetic field. To affix the magnets 16 in place, the magnet ring assembly 14 comprises an upper magnet holder 18, which includes an annular recess 20 that captures the tops 22 of the magnets 16, and a lower magnet holder 24, which includes an annular recess 26 that captures the bottoms 28 of the magnets 16. Preferably, the walls that straddle the annular recesses 20 and 26 are as thin as possible (e.g., 0.0050 inch), so that the thickness of the magnets 16 can be maximized. For purposes of structural integrity, the magnets 16 are held in place by bonding the tops 22 and bottoms 30 of the magnets 16 within the respective annular recesses 20 and 26. The magnet ring assembly 14 further comprises eight ring rods 32, which are located between the respective eight magnets 16 and TIG welded through corresponding holes 34 within the upper and lower magnet holders 18 and 24 to maintain the structural integrity of the magnet ring assembly 14.

Referring back to FIGS. 1 and 2, the piston assembly 12 comprises a cylinder 36 having a bore 38, a cylindrical piston 40 that axially moves within the bore 38 of the cylinder 36, a piston end cap 42 disposed mounted in the end of the piston 40, and a piston bracket 44 disposed on the opposite end of the piston 40. As best shown in FIGS. 1 and 4, the upper magnet holder 18 of the magnet ring assembly 14 comprises eight radially to circumferentially disposed mounting apertures 46, and the piston bracket 44 comprises eight corresponding circumferentially disposed mounting apertures 48, which are used to firmly bolt the magnet ring assembly 14 to the piston assembly 12, as illustrated in FIG. 1. So that the top surface of the upper magnet holder 18 is flush with the mounting surface of the piston bracket 44, the piston bracket 44 further includes eight radially disposed apertures 50 between the mounting apertures 48 to accommodate the ends of the ring rods 32 (shown best in FIG. 3) protruding through the upper magnet holder 18.

Referring still to FIG. 2, the piston assembly 12 further comprises gas bearings 52 that receive gas, e.g., helium, from a sealed cavity 54 within the piston 40. It should be noted that any suitable of gas bearings 52 can be used. In the illustrated embodiment, four circumferentially disposed pairs of gas bearings 52 (only two pairs shown) are used. A check valve 56 (best shown in FIG. 1) provides a unidirectional flow of gas from the front of the piston 40, through the sealed cavity 54 and out through the gas bearings 52. Preferably, the gas bearings 52 comprise orifices that are on the order of a one or two mils (e.g., 1.5 mils), so that only a small amount of gas escapes from the sealed cavity 54 though the gas bearings 52, thereby preserving the pressure that has built up in the sealed cavity 54 until the next stroke of the piston 40. Typically, only 2–5 percent of gas that is displaced by the piston 40 enters the sealed cavity 54 through the check valve 56.

Because the smallest drill bit currently is around 2.9 mils with a maximum length of about 30 mils, the orifices of the gas bearings 52 cannot be drilled. Instead, each of the gas bearings 52 includes an aperture 58 in which there is disposed a gas bearing restrictor in the form of a screw 60 that can be turned to adjust the rate of gas that flows through the gas bearing 52. That is, the length of the passage created by the threaded helix between the screw 60 and the aperture 58 can be decreased or increased by carefully rotating the screw 60 in and out of the aperture 58 until the correct flow rates are attained in all gas bearings 52. Alternatively, sapphire/ruby or glass orifices (not shown) with very small diameters can be used as the gas bearing restrictor to provide a consistent gas flow at the designed rate without requiring adjustment. These orifices, however, can only be made so long, and as will be described in more detail below, have reliability problems. The piston assembly 12 further comprises centering ports 62 (shown in FIG. 1), which provide a return gas circuit from region adjacent the back of the piston 40 to the region adjacent the front of the piston 40.

Due to the tight tolerances (typically, about 5 mils) between the magnet ring assembly 14 and adjacent laminations (only internal lamination 28 shown) that are disposed on both the inside and outside surface of the magnet ring assembly 14, the circularity of the magnet ring assembly 14 must be perfect or near-perfect, so that it does not rub against the adjacent laminations. For the same reason, the concentricity between the piston 40 and the magnet ring assembly 14 must be perfect or near-perfect. In addition, the magnets 16 must be in a perfect or near-perfect cylindrical equidistant arrangement, so that the generated magnetic field is radially uniform. In this manner, a uniform load will be provided to the gas bearings 52, thereby maximizing the efficiency of the piston assembly 12. Thus, it can be appreciated that great care must be taken when assembling the magnet ring assembly 14, resulting in often tedious and time consuming process that is magnified by the relatively large number of parts (eighteen-eight magnets, eight ring rods, two magnet holders) that make up the magnet ring assembly 14. Notably, magnet segments cannot currently be made as a single fully cylindrical piece due to magnetic technology limitations. Thus, multiple magnets must be painstakingly mounted within the upper and lower magnet holders 18 and 24. Also, the measures taken to ensure that the magnet ring assembly 14 and piston 40 are concentric along their lengths, namely, the drilling of the apertures 50 within the piston bracket 44 that accommodate the protruding ring rods 32, provide additional time-consuming steps. Furthermore, because the walls adjacent the annular recesses 20 and 26 of the respective upper and lower magnet holders 18 and 24 are preferably very thin, so that the thickness of the magnets 16 can be maximized, these walls are often inadvertently perforated, resulting in the scrapping of the respective magnet holder.

In addition, all eight screws 60 within the apertures 58 of the gas bearings 52 have to be iteratively adjusted and the flow rate measured throughout the fabrication process of the cryocooler to ensure that the gas bearings 52 exhibit the designed flow rate at the end of the final assembly process. Great care must be taken when rotating the screws 60 within the apertures 58, so that the heads of the screws 60 are not stripped. Occasionally, however, this will occur, requiring that the expensive piston assembly 12 be scrapped.

Reliability of the cryocooler is another concern. In the field of commercial Radio Frequency (RF) communications, it is desired that Stirling cycle cryocoolers provide maintenance free operation for tens of thousands of hours, and more preferably, at least forty thousand hours. After mere thousands of operational hours, however, cryocoolers that incorporated piston/magnet assemblies similar to the assembly 10 described above were failing. It was discovered that, when the piston 40 banged against the cylinder 36, the epoxy joints between the magnets 16 and the upper and lower magnet holders 18 and 24 would break and/or the magnet ring assembly 14 would go out of round, causing the magnet ring assembly 14 to rub against the adjacent laminations and/or unequal loading of the gas bearings 52. As a result, the magnet ring assembly 14 would deteriorate rapidly. Thus, the high energy transmitted to the magnet ring assembly 14 due to the high frequency application of the motor stresses the importance of the attachment technique between magnet and the magnet holder. It was also discovered that when sapphire/ruby or glass orifices are alternatively used as the gas restrictors, a static charge would build up as the gas flows through them at 60 Hz. As a result, very fine particles would collect within the very small diameters (typically about 0.0012 inch in diameter) and eventually plug them.

Thus, there is a need for an improved magnet ring assembly and gas bearing restrictor that can be used with piston assemblies, such as those found in cryocoolers.

SUMMARY OF THE INVENTION

The present inventions are directed to magnet ring assemblies and piston/magnet assemblies, motors, and cryocoolers that utilize such magnet ring assemblies. In accordance with the present inventions, a magnet ring assembly comprises a cylindrical magnet holder having an inner surface, and one or more magnets disposed around the inner surface of the cylindrical magnet holder. In the preferred embodiment, a plurality of equidistantly spaced magnets is disposed around the inner surface of the cylindrical magnet holder. So that the magnets conform to the cylindrical magnet holder, each of the plurality of magnets is preferably arcuate and comprises an outer radius of curvature substantially equal to the inner radius of the cylindrical magnet holder. The magnets can be captured by the magnet holder in a variety of directions.

For example, the magnets can be rotationally captured by bonding them to the inner surface of the magnet holder. The magnets can be radially captured by providing the plurality of magnets with a radially uniform magnet polarity, such that they mutually magnetically repel each other against the inner surface of the cylindrical magnet holder. Also, each of the magnets can exhibit an outer arcuate length that is greater than the inner arcuate length, such that any one of the magnets is captured by the edges of the adjacent magnets, and thus cannot be displaced radially inward. The magnets can be axially captured by forming an annular ledge on the inner surface of the magnet holder and disposing one of the axial edges of each magnet on the annular ledge, and swaging the axial edge of magnet holder around the other axial edge of each of the magnets.

By way of non-limiting example, the afore-described magnet ring assembly provides various advantages. For example, the magnets can be mechanically captured to sustain high frequency operation of the piston on which the magnet ring assembly is mounted. Also, assuming that the magnet holder is a unibody structure, the number of parts (not including the magnet sectors) can be reduced to one, and no TIG welds are required. In addition, alignment of the magnet sectors can be easily accomplished, since the magnet sectors self-align to each other as they are inserted into the magnet holder. Also, since the magnet sectors are not associated with the outer surface of the magnet holder, the outer surface can be grinded, such that it is concentric with the inner surface thereof.

The present inventions are also directed to gas bearing restrictors, and piston assemblies, motors, and cryocoolers that utilize such gas bearing restrictors. In accordance with the present inventions, a piston assembly comprises a cylinder having a to bore, an electrically conductive piston reciprocally disposed within the cylinder bore, a gas cavity formed within the piston, and one or more gas bearings associated with the piston. Each of the gas bearings includes an aperture formed within the piston and an electrically conductive tubular member extending through the aperture. The tubular member includes a lumen in communication between the gas cavity and the cylinder bore. In the preferred embodiment, the tubular member is a composite tube composed of outer and inner tubes that are press-fit into the aperture.

By way of non-limiting example, the afore-described gas bearing provides various advantages. For example, because the tubular member is electrically conductive, static buildup is minimized, thereby minimizing the chances that the orifice will become plugged. In addition, if the tubular member is a composite tube formed of outer and inner tubular members, the wall of the composite tube can be made thick for ease of placement into the aperture, while forming an inner lumen that is relatively small. Thus, no adjustment of the gas bearings are required, and at most, one flow measurement needs to be performed, since the size of the lumen will not change during the manufacturing process.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
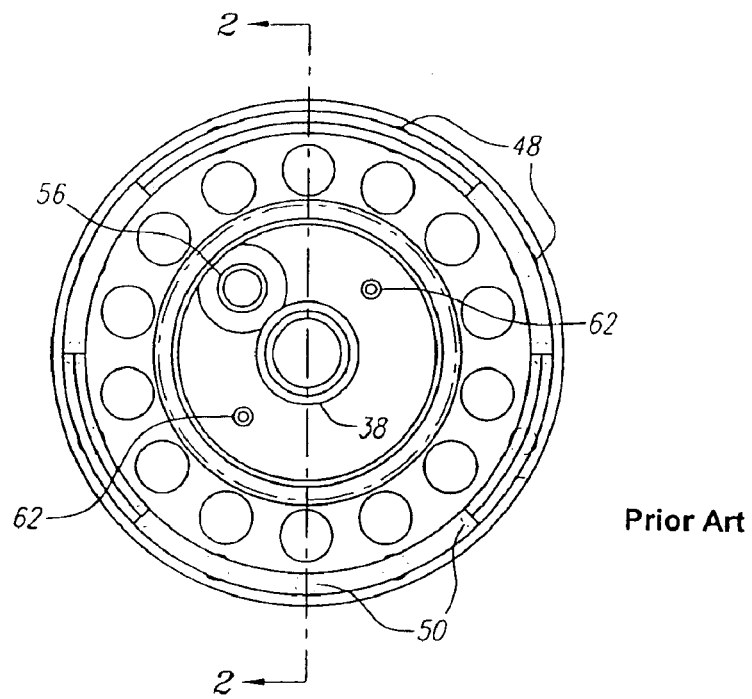
FIG. 1 is a top view of a prior art piston/magnet assembly.
Figure 2:
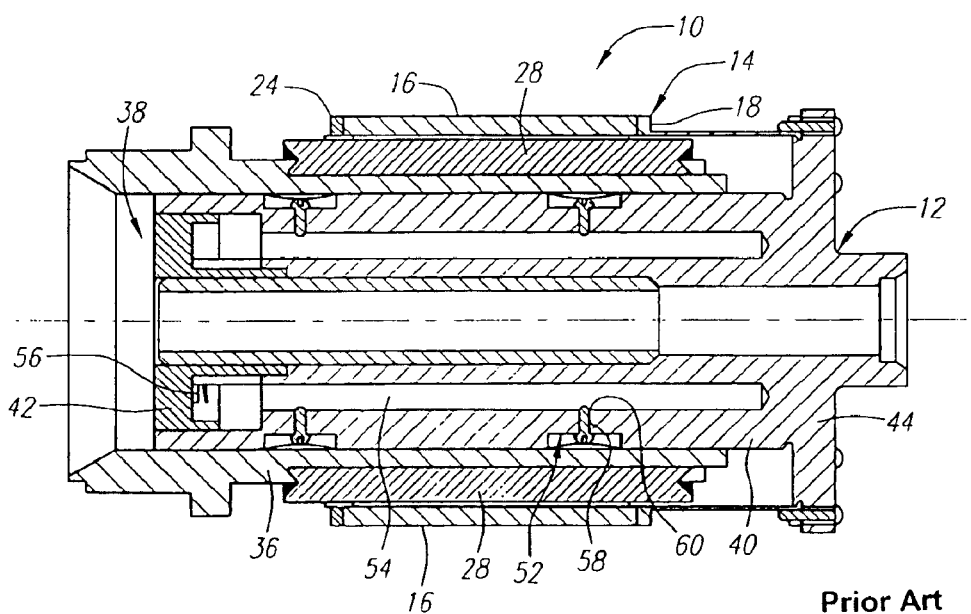
FIG. 2 is a cross-sectional view of the piston/magnet assembly of FIG. 1, taken along the line 2—2.
Figure 3:
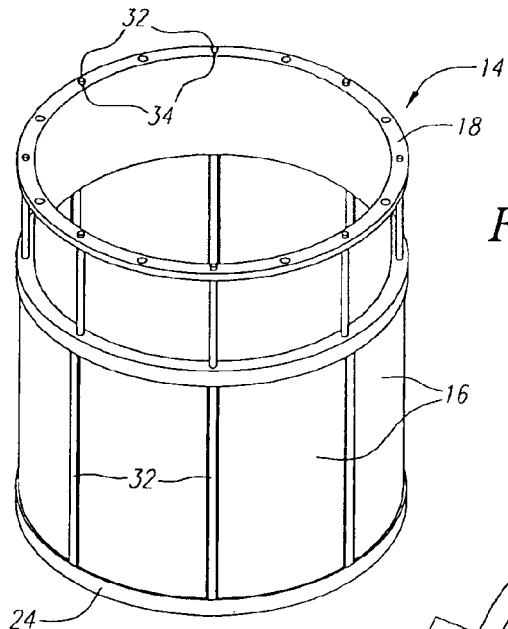
FIG. 3 is a perspective view of a magnet ring assembly used in the piston/magnet assembly of FIG. 1.
Figure 4:
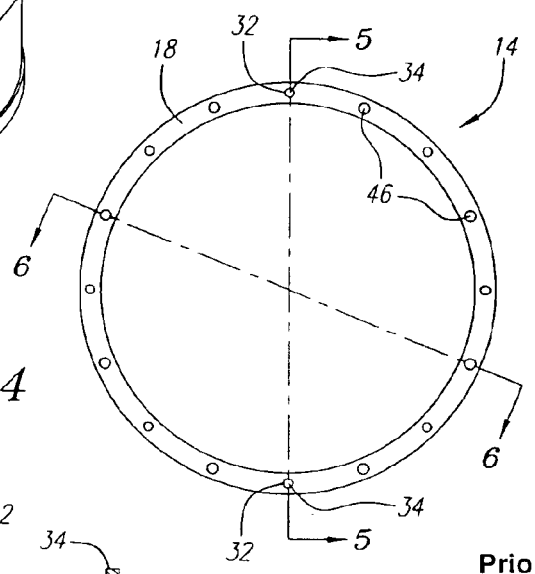
FIG. 4 is a top view of the magnet ring assembly of FIG. 3.
Figure 5:
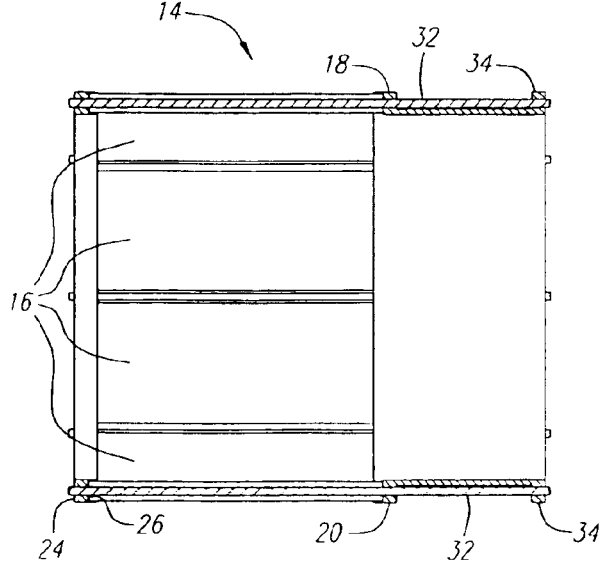
FIG. 5 is a cross-sectional view of the magnet ring assembly of FIG. 4, taken along the line 4—4.
Figure 6:
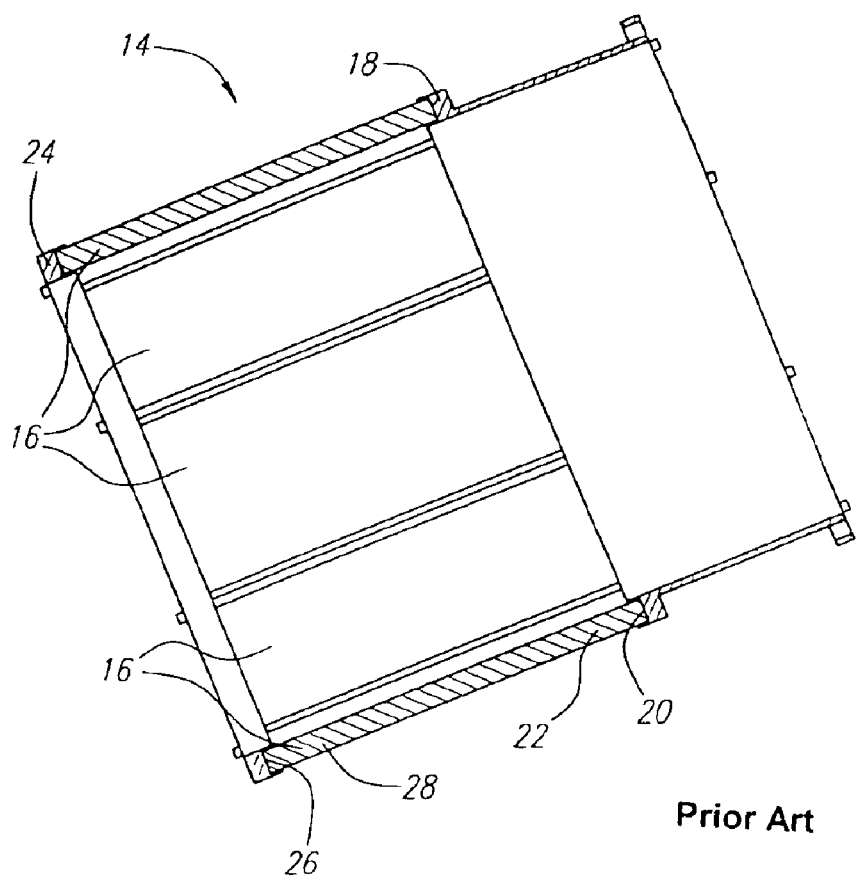
FIG. 6 is a cross-sectional view of the magnet ring assembly of FIG. 4, taken along the line 5—5.
Figure 7:
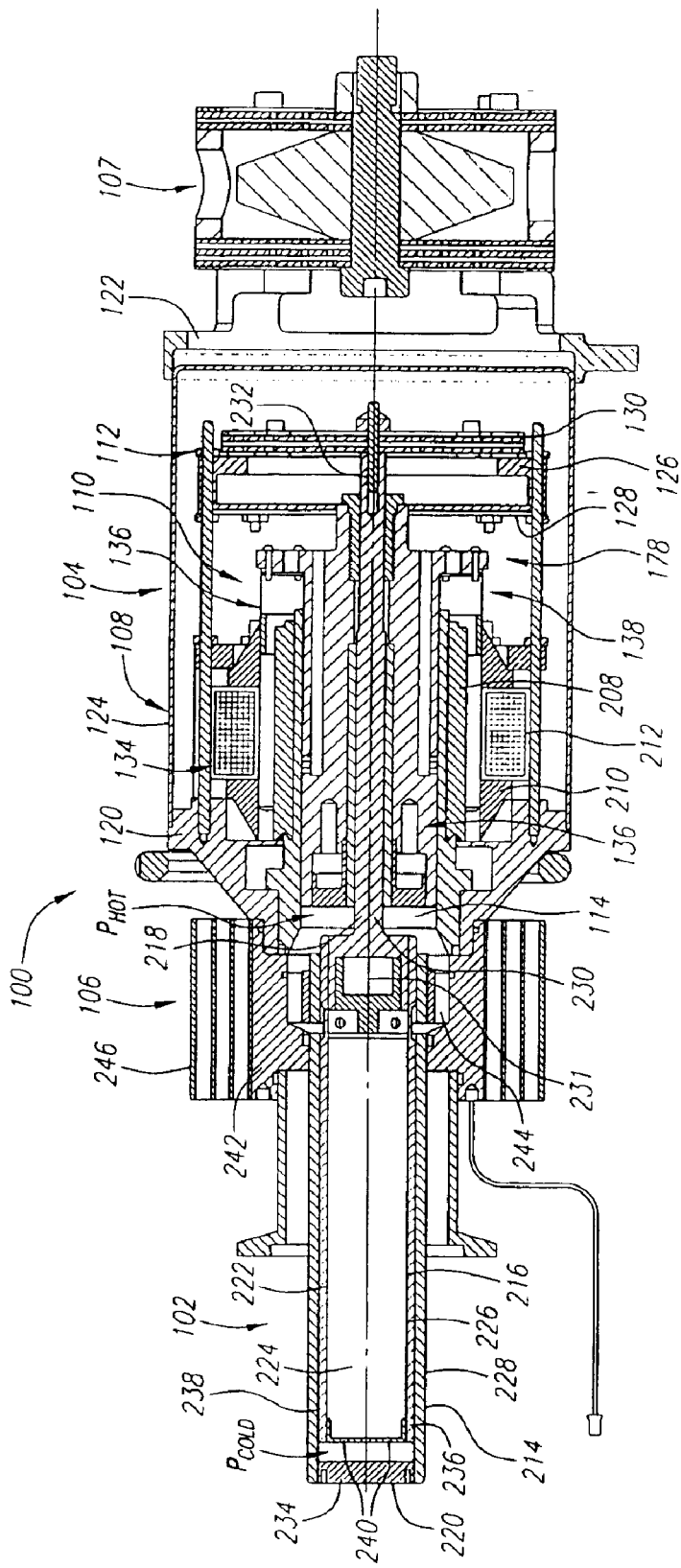
FIG. 7 is a cross-sectional view of a cryocooler constructed in accordance with one preferred embodiment of the present inventions.

FIG. 7 illustrates a Stirling cycle cryocooler 100 constructed in accordance with a preferred embodiment of the present inventions. As shown, the Stirling cycle cryocooler 100 includes a displacer unit 102 that is associated with a cold region $P_{COLD}$ and a warm region $P_{HOT}$ at its opposite ends, a compressor unit 104, which is in fluid communication with the displacer unit 102, and a heat exchanger unit 106 between the displacer unit 102 and the compressor unit 104. The cryocooler 100 also includes a passive counterbalancer 107, which cancels the movement of the moving internal components of the compressor unit 104, thereby minimizing vibration of the cryocooler 100.

The compressor unit 104 comprises a pressure housing assembly 108, motor 110, spring assembly 112, and a compression chamber 114 that is coincident with the warm region $P_{HOT}$. The housing assembly 118 comprises a front bracket 120, a rear bracket 122, and a cylindrical housing section 124 mounted therebetween. The spring assembly 112 comprises a spring bracket 126, and a pair of axially spaced flexure springs 128 and 130 mounted thereon, which as will be described in further detail below, provide the necessary displacement phase between the compression and displacement functions of the cryocooler 100. The motor 110 comprises a piston/magnet assembly 132 and a magnetic induction assembly 134, which magnetically communicate with each other to provide the reciprocating action required to compress the fluid, e.g., gaseous helium, within the compression chamber 114. The piston/magnet assembly 132 comprises a piston assembly 136 and an associated magnet ring assembly 138.

Figure 8:
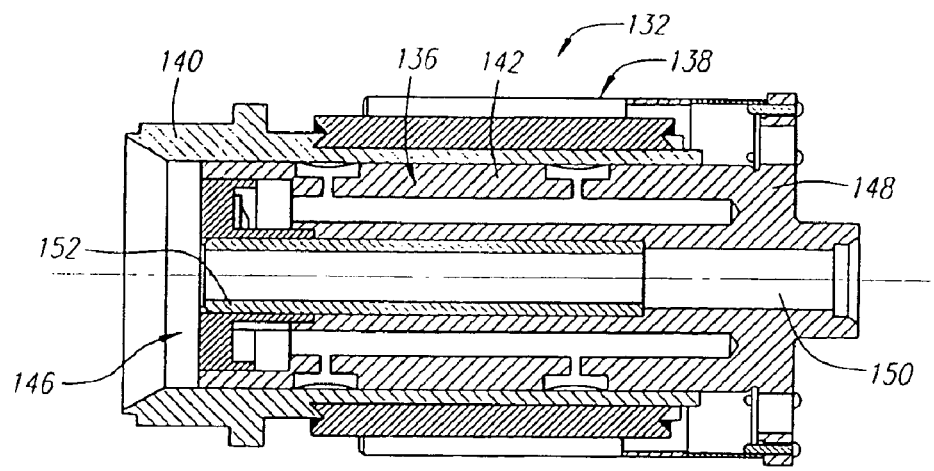
FIG. 8 is a cross-sectional view of a novel piston/magnet assembly used in the cryocooler of FIG. 7.
Figure 9:
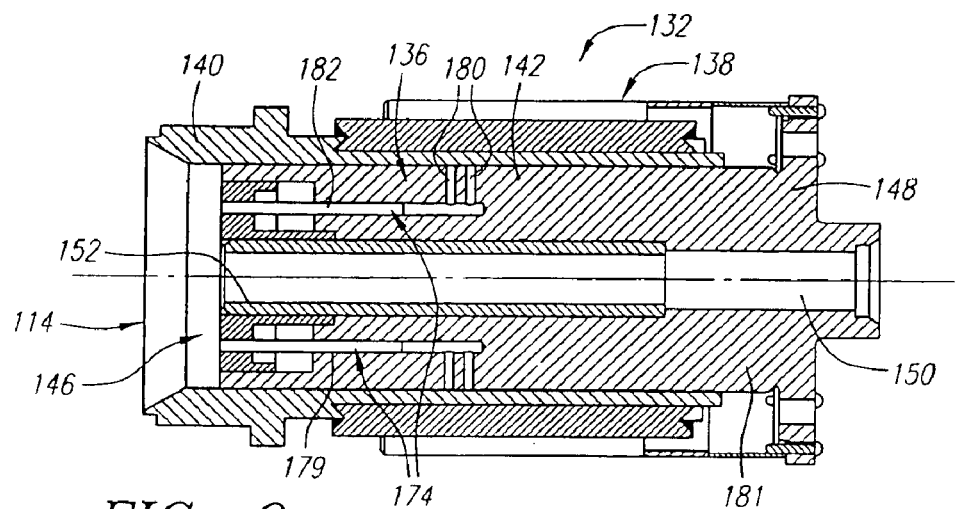
FIG. 9 is another cross-sectional view of the piston/magnet assembly used in the cryocooler of FIG. 7.
Figure 10:
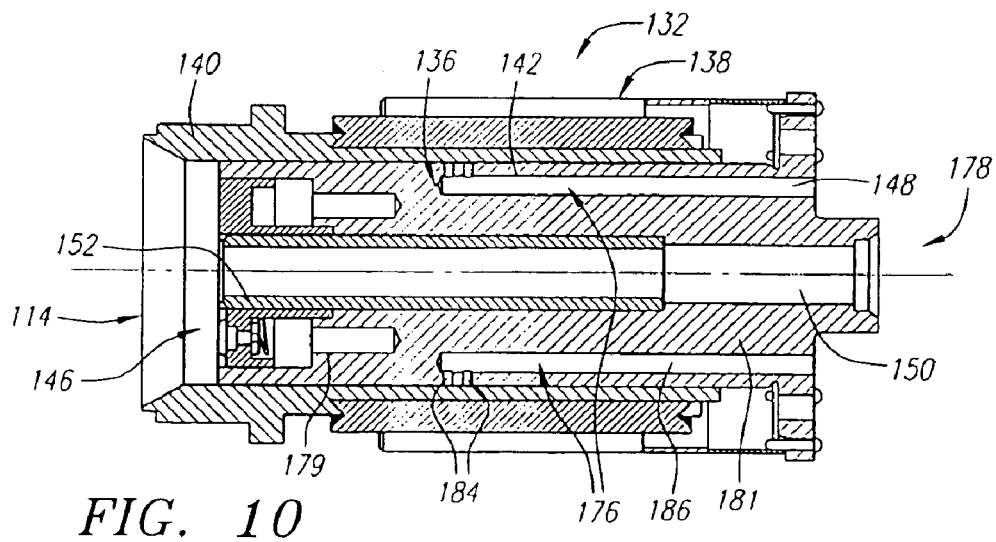
FIG. 10 is still another cross-sectional view of the piston/magnet assembly used in the cryocooler of FIG. 7.

Referring further to FIGS. 8–10, the piston assembly 136 includes a cylinder 140 that is mounted to the front bracket 120 of the housing assembly 118 (shown in FIG. 7), a piston 142 slideably disposed within a bore 146 of the cylinder 140, and a piston mounting bracket 148 for mechanically coupling the piston 142 to the piston flexure spring 128 of the spring assembly 112, and for mechanically coupling the magnet ring assembly 138 to the piston 142. The piston 142, along with the magnet ring assembly 138, is thus adapted for reciprocating motion within the cylinder 140. The piston 142 comprises a bore 150 in which there is disposed a displacer lining 152, which as will be described in further detail, is associated with the displacer unit 102 and facilitates the fluid displacement function of the cryocooler.

Referring specifically to FIG. 8, the piston assembly 136 further comprises a plurality of gas bearings 154 (in the illustrated embodiment, four pairs of gas bearings) that are circumferentially disposed about and circumferentially formed around the piston 142 in an equidistant manner, a substantially sealed cavity 156 formed within the piston 142 for providing gas, e.g., helium, to the gas bearings 154, and a check valve 158 that provides a unidirectional fluid communication conduit from the warm region $P_{HOT}$ (i.e., the compression to chamber 114) to the sealed cavity 156 when the pressure of the gas within that region exceeds the pressure within the cavity 156 (i.e., exceeds the piston reservoir pressure). Thus, it can be appreciated that when the piston 142 moves towards the compression chamber 114, the gas from the compression chamber 114 is forced through the check valve 158, into the sealed cavity 156, and out through the gas bearings 154.

Figure 11:
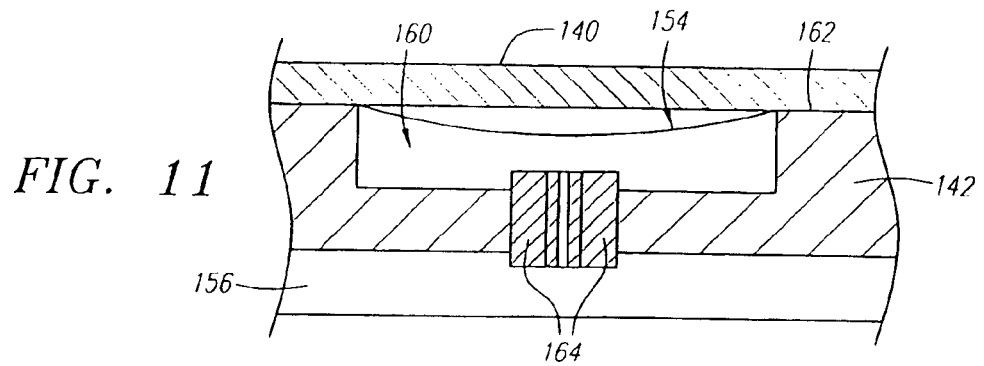
FIG. 11 is a close-up view of a novel gas bearing used in the piston/magnet assembly of FIG. 8.

With specific reference to FIG. 11, the detailed structure of one of the gas bearings 154 will now be described. The gas bearing 154 comprises a bearing space 160 formed within the external surface 162 of the piston 142, an aperture 164 transversely extending from the bearing space 160 through the wall 164 of the piston 142 and into the sealed cavity 156, and a composite tube 166 that extends through the aperture 164. The composite tube 166 comprises a lumen 168 that is in communication between the bearing space 160 and the sealed cavity 156 to provide a flow of gas from the sealed cavity 156 into the cylinder 140.

Preferably, the aperture 164 is formed by transversely drilling a hole through wall 164 of the piston 142. In the illustrated embodiment, the hole has a diameter of approximately 0.020 inch and a length of 0.100 inch. The outer diameter and length of the composite tube 166 is approximately 0.020 inch and 0.100 inch, respectively, and the diameter of the lumen 168 is approximately 0.0012 inch. Thus, the relatively thick wall of the composite tube 166, which in the illustrated embodiment is approximately 0.0094 inch thick, allows the composite tube 166 to be easily press-fit into the aperture 164. Significantly, the composite tube 166 is composed of an electrically conductive material, such as, e.g., stainless steel. As a result, the composite tube 166 is electrically grounded through the electrically conductive piston 142, and thus, a "static charge" will not build up, thereby preventing or at least minimizing the collection of dust particles within the lumen 168. Also, because the diameter of the lumen 168 does not change during the manufacturing process of the cryocooler 100, and is consistent throughout any given run of a tubing, flow measurements for each gas bearing 154 need not be performed, or at the most performed only once, thus reducing cost.

Figure 12:
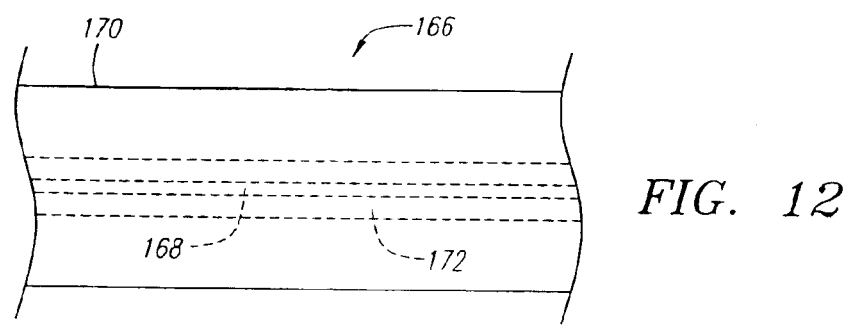
FIG. 12 is a plan view of a composite tube used in the gas bearing of FIG. 11.

Referring to FIG. 12, the composite tube 166 can be advantageously composed of an outer tubular member 170 and an inner tubular member 172 to provide the proper wall thickness of the composite tube 166, while allowing for a very small diameter lumen 168. Specifically, to manufacture the composite tube 166 with exemplary inner and outer diameters of 0.0012 inch and 0.020 inch, long lengths of stainless steel tubing, similar to "hypodermic needle tubing," can be fabricated with an inner diameter of 0.0015 inch and an outer diameter of 0.0070 inch to form the inner tubular member 172. Long lengths of stainless steel tubing can be fabricated with an inner diameter of 0.0075 inch and an outer diameter of 0.0020 inch to form the outer tubular member 170. The outer tubular member 170 is then swaged over the inner tubular member 172 to form a long length of the thick wall composite tube 166, which will have an outer diameter of 0.020 inch, an inner diameter of approximately 0.0012 inch (reduced from 0.0015 inch due to the swaging), and a wall thickness of 0.0094 inch. The length of the composite tube 166 is then cut into 0.100 inch lengths, the ends of which can be chemically etched to provide multiple burr-free composite tubes 166. Alternatively, the length of the composite tube 166 can be cut using "wire electric discharge machining" to provide for a multiplicity of burr-free composite tubes 166. The lengths of the composite tubes 166 are selected to provide the exact flow rate through to the lumen 168 of the composite tube 166. The composite tubes 166 are then press-fit into the drilled apertures 164 within the piston 142. A suitable manufacturer for fabricating the composite tube 166 is Phillips & Johnston, Inc., located in Glen Ellyn, Ill.

Referring specifically to FIGS. 9 and 10, the piston assembly 136 further comprises a pair of front centering port assemblies 174 (FIG. 9) and a pair of rear centering port assemblies 176 (FIG. 10) to provide a pressure release conduit between the space 178 at the rear end of the compressor unit 104 and the compression chamber 114. Specifically, each front centering port assembly 174 includes double transverse ports 180 that communicate with the cylinder 140, and a lumen 182 that axially extends within the front 179 of the piston 142 and provides communication between the double ports 180 and the compression chamber 114. Each rear centering port assembly 176 includes double transverse ports 184 that communicate with the cylinder 140, and a lumen 186 that axially extends within the rear 181 of the piston 142 and provides communication between the double ports 182 and the rear space 178 in the compressor unit 104. The double ports 180 and 184 communicate with each other through an annular indentation (not shown) formed on the inner surface of the cylinder 140, so that the rear space 178 momentarily communicates with the compression chamber 114 as the piston reciprocally moves within the cylinder 140, thereby equalizing the pressure between the rear space 178 and the compression chamber 114. Notably, the axial displacement between each of the double ports 180 or 184 provide a self-compensating air flow over an operating range of the piston 142. That is, only one port from each of the double ports 180 and 184 provide air flow during low piston 142 strokes, while both ports from each of the double ports 180 and 184 provide air flow during high piston 142 strokes. In this manner, the piston 142 is not axially biased towards the compression chamber 114 by pressure that may otherwise build up in the rear space 178 as gas flows from the gas bearings 154 into the rear space 178.

Figure 13:
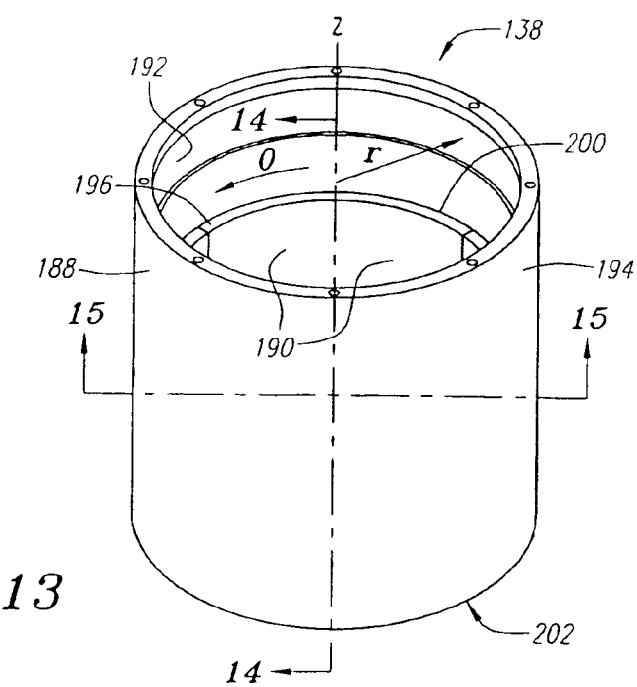
FIG. 13 is a perspective view of a novel magnet ring assembly used in the piston/magnet assembly of FIG. 8.
Figure 14:
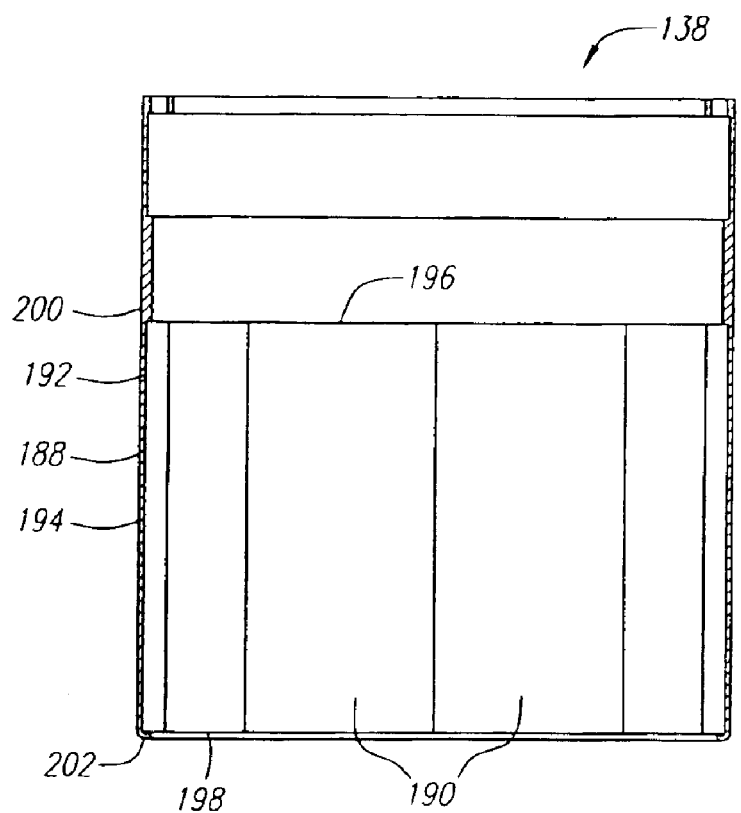
FIG. 14 is a cross-sectional view of the magnet ring assembly of FIG. 13, taken along the line 13—13.
Figure 15:
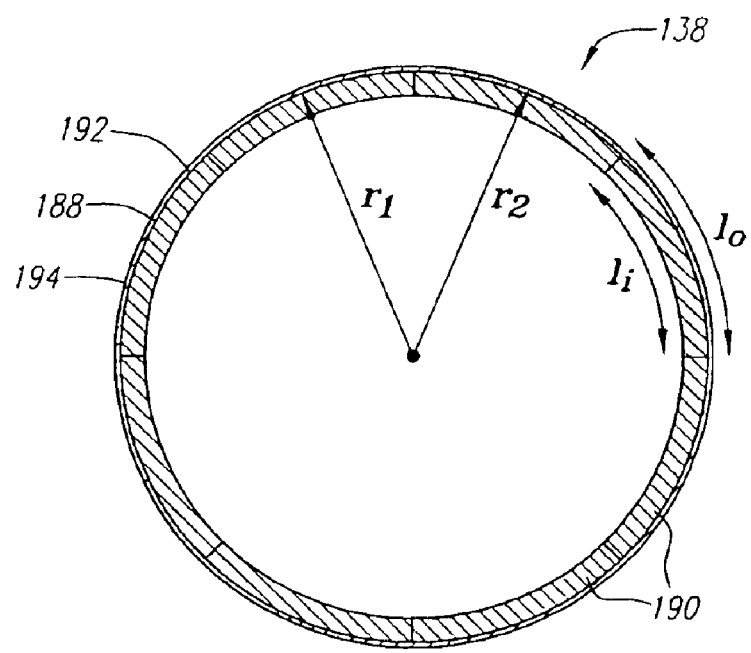
FIG. 15 is a cross-sectional view of the magnet ring assembly of FIG. 13, taken along the line 14—14.

With specific reference to FIGS. 13–15, the magnet ring assembly 138 will now be described. The magnet ring assembly 138 comprises a unibody cylindrical magnet holder 188 and a plurality of arcuate magnet sectors 190 mounted within the magnet holder 188. In the illustrated embodiment, eight magnet sectors 190 are used, but it should be understood, that any number of magnet sectors 190 can be used to provide the proper magnetic interaction with the magnetic induction assembly 134. The eight magnet sectors 190 are circumferentially disposed about the inner surface 192 of the magnet holder 188 in a circular equidistant pattern. Each of the magnet sectors 190 exhibits an outer radius of curvature $r_1$, and has an outer surface 191 within an outer arcuate length $l_o$ and an inner surface 192 with an arcuate length $l_1$. So that the outer surfaces 191 of the magnet sectors 190 are flush within the inner surface 192 of the magnet holder 188, the outer radius of curvature $r_1$, for each of the magnet sectors 190 is equal to the inner radius r2 of the magnet holder 188.

The magnet holder 188 is composed of a high-resistivity material ($\geq$70 microhm cm), such as, e.g., stainless steel or any non-magnetic material. In this manner, magnetic losses through the magnet holder 188 are minimized. To further reduce the magnetic losses, the wall thickness of the magnet holder 188 surrounding the magnet sectors 190 is reduced, e.g., to less than 0.012 inch, by machining the outer surface 194 of the magnet holder 188. The inner surface 192 of the magnet holder 188 is machined to establish the true position to outer diameter needed for alignment of the piston 142 with the cylinder 140.

The eight magnet sectors 190 are affixed in place in three directions: the axial direction (Z-direction), rotational direction (θ-direction), and the radial direction (r direction). In the axial direction, the magnet sectors 190 are axially captured from both ends to eliminate any chance of escape due to the alternating axial motion of the magnet ring assembly 138. Specifically, each of the magnet sectors 190 comprises opposing axial edges 196 and 198, one of which is axially affixed in the first direction by an annular ledge 200 formed around the inner surface 192 of the magnet holder 188, and the other of which is axially affixed in the second direction by swaging the axial edge 202 of magnet holder 188 inward. In addition to capturing the magnet sectors 190, the swaged axial edge 202 provides structural integrity to the magnet holder 188, so that the magnet ring assembly 138 maintains circularity. In the rotational direction, the magnet sectors 190 are bonded to the inner surface 192 of the magnet holder 188 using a suitable bonding material, such as, e.g., epoxy, which exhibits good shear strength at high temperatures. In the radial direction, the arrangement of the magnet sectors 190 have a uniform radial polarity. In the illustrated embodiment, the polarity of the magnet sectors 190 is oriented with the North Pole pointing outward and the South Pole pointing inward. Thus, the uniform radial polarity repels each magnet sector 190 from the other magnet sectors 190 towards the inner surface 192 of the magnet holder 188. In this manner, the outwardly radial magnetic force facilitates the securing of the magnet sectors 190 to the magnet holder 188. In addition, because each of the magnet sectors 190 has an outer arcuate length $l_o$ that is greater than an inner arcuate length $l_i$, an interference fit is provided between adjacent magnet sectors 190, thereby preventing the magnet sectors 190 from being radially displaced from the adjacent magnet sectors 190.

Thus, it can be appreciated that the magnet sectors 190 are mechanically captured to sustain high frequency operation of the piston 142. Other advantages are provided by the magnet ring assembly 138. For example, compared to the prior art magnet ring assembly 138 illustrated in FIGS. 3–6, the number of parts (not including the magnet sectors 190) is reduced from ten to one, and 16 TIG welds are eliminated, thereby also eliminating the need to drill apertures within the piston mounting bracket 148 in order to accommodate ring rods. In addition, alignment of the magnet sectors 190 is easily accomplished, since the magnet sectors 190 self-align to each other as they are inserted into the magnet holder 188. Also, since the magnet sectors 190 are not associated with the outer surface 194 of the magnet holder 188, the outer surface 194 can be grinded, such that it is concentric with the inner surface 192 thereof.

Referring back to FIG. 7, the magnetic induction assembly 134 comprises internal laminations 208 mounted to the outside of the cylinder 140, external laminations 210 that are mounted between the front and rear motor brackets 120 and 122 in close outward proximity to the magnet ring assembly 138 to form a gap (not shown), and a motor coil 212 that lies within the recesses formed within the external laminations 210 and surrounds the magnet ring assembly 138. The internal and external laminations 208 and 210 are preferably composed of a ferrous material. Thus, it will be appreciated that as the electrical polarity of the coil 212 is alternately switched back and forth, the resulting magnetic force that is applied to the magnet ring assembly 138 across the gap changes. As a result, the magnet ring assembly 138 reciprocally moves within the gap, and the piston 142 accordingly reciprocally moves within the cylinder 140.

The displacer unit 102 functions in a conventional manner and includes a displacer housing 214, a displacer cylinder assembly 216, a displacer rod 218, and a heat acceptor 220. The displacer cylinder assembly 216 comprises a displacer body 222 that is slideably mounted within the displacer housing 214, and a regenerator 224 mounted within the displacer body 222. The displacer body 222 rests against a displacer liner 226 affixed to an inner wall 228 of the displacer housing 214. The displacer rod 218 is slideably disposed within the displacer liner 152 mounted within the piston bore 150, and is coupled at one end 230 to a base section 231 of the displacer body 222 and coupled at the other end 232 to the displacer flexure spring 130. Thus, under appropriate conditions, it is possible for the displacer body 222 to oscillate within the displacer housing 214.

The heat acceptor 220 includes a radial component 234 and an annular component 236. The radial component 234 is generally perpendicular to the long axis of the displacer unit 102. The annular component 236 extends from the radial component 234 and extends axially beyond the edge of the displacer cylinder assembly 216, abutting against a distal end 238 of the displacer liner 226. The heat acceptor 220 is preferably brazed to the displacer housing 214 to provide a hermetically sealed environment. The heat acceptor 220 is preferably made from high purity copper or oxygen-free-high-conductivity (OFHC) copper. The displacer cylinder assembly 216 includes a plurality of radial holes 240. The radial holes 240 permits additional flow of helium within the cold region $P_{COLD}$, impinging directly on the heat acceptor 220. The radial holes 240 assist in decreasing the convective resistance between the heat acceptor and the helium gas within the cryocooler 100. The structure and function of the heat acceptor 220 is discussed in further detail in U.S. Pat. No. 6,327,862 entitled "Stirling Cycle Cryocooler With Optimized Cold End Design," which is hereby expressly incorporated herein by reference.

The heat exchanger unit 106, which is located between the displacer unit 102 and the compressor unit 104, includes a heat exchanger block 242 and a flow diverter 244. The heat exchanger block 242 is mounted to the front bracket 120 of the compressor unit 104, and includes a plurality of internal heat exchanger fins 244 and a plurality of external heat rejector fins 246. Thus, the heat exchanger unit 106 is designed to facilitate heat dissipation from a gas, such as helium, that is compressed in the warm region $P_{HOT}$ located at the juncture between the displacer unit 102 and the compressor unit 104 (the region $P_{HOT}$ also is referred to herein as the compression chamber 114). Preferably, the heat exchanger block 242, internal heat exchanger fins 244 and external heat rejector fins 246 are made from a thermally conductive metal such as high purity copper.

During operation, the piston 142 and displacer cylinder assembly 216 preferably oscillate at a resonant frequency of approximately 60 Hz and in such a manner that the oscillation of the displacer cylinder assembly 216 is approximately 90° out of phase with the oscillation of the piston 142. Stated somewhat differently, it is preferred that the motion of the displacer cylinder assembly 216 will "lead" the motion of the piston 142 by approximately 90°.

Those skilled in the art will appreciate that, when the displacer cylinder assembly 216 moves to the cold region $P_{COLD}$, most of the fluid, e.g. helium, within the system moves around the flow diverter 244 and through the internal heat exchanger fins 244 into the warm region $P_{HOT}$. Due to the phase difference between the motion of the displacer cylinder assembly 216 and the piston 142, the piston 142 should be at mid-stroke and moving in a direction toward the heat acceptor 220 when the end of the displacer cylinder assembly 216 is located near the heat acceptor 220. This causes the helium in the warm region $P_{HOT}$, i.e., the compression chamber 114, to be compressed, thus raising the temperature of the helium. The heat of compression is transferred from the compressed helium to the internal heat exchanger fins 244 and from there to the heat exchanger block 242 and external heat rejector fins 246. From the heat rejector fins 246, the heat is transferred to ambient air. As the displacer cylinder assembly 216 moves to the warm region $P_{HOT}$, the helium is displaced to the cold region $P_{COLD}$. As the helium passes through the displacer body 222, it deposits heat within the regenerator 224, and exits into the cold region $P_{COLD}$ at approximately 77 K. At this time, the compressor piston 142 preferably is at mid-stroke and moving in the direction of the spring assembly 112. This causes the helium in the cold region $P_{COLD}$ to expand further reducing the temperature of the helium and allowing the helium to absorb heat. In this fashion, the cold region $P_{COLD}$ functions as a refrigeration unit and may act as a "cold" source.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims.

What is claimed is:

1. A piston assembly for use in a motor, comprising:
   a cylinder having a bore;
   an electrically conductive piston reciprocally disposed within the cylinder bore;
   a gas cavity formed within the piston; and
   one or more gas bearings associated with the piston, each of the one or more gas bearings including an aperture formed within the piston and an electrically conductive tubular member extending through the aperture, the tubular member having a lumen in communication between the gas cavity and the cylinder bore.

2. The piston assembly of claim 1, wherein the lumen has an inner diameter equal to or less than 0.0020 inch.

3. The piston assembly of claim 1, wherein the lumen has an inner diameter equal to or less than 0.0015 inch.

4. The piston assembly of claim 1, wherein the tubular member has a diameter equal to or less than 0.0200 inch.

5. The piston assembly of claim 1, wherein the tubular member has a length between 0.100 inch and 0.200 inch.

6. The piston assembly of claim 1, wherein the tubular member is press fit into the aperture.

7. The piston assembly of claim 1, wherein the tubular member is a composite tube composed of an inner tubular member and an outer tubular member.

8. The piston assembly of claim 1, wherein the one or more gas bearings comprises a plurality of gas bearings.

9. The piston assembly of claim 8, wherein the plurality of gas bearings are equidistantly disposed around a circumference of the piston.

10. The piston assembly of claim 1, further comprising a unidirectional check valve in communication between the exterior of the piston and the gas cavity.

11. The piston assembly of claim 1, wherein each of the one or more gas bearings further comprises a bearing space formed within the piston, wherein the lumen is in communication with the cylinder bore via the bearing space.

12. A piston assembly for use in a motor, comprising:
    a cylinder having a bore;
    an electrically conductive piston reciprocally disposed within the cylinder bore;
    a gas cavity formed within the piston; and
    one or more gas bearings associated with the piston, each of the one or more gas bearings including an aperture formed within the piston and an electrically conductive composite tube extending through the aperture, the composite tube comprising an outer tubular member and an inner tubular member, the inner tubular member having a lumen in communication between the gas cavity and the cylinder bore.

13. The piston assembly of claim 12, wherein the lumen has an inner diameter equal to or less than 0.0020 inch.

14. The piston assembly of claim 12, wherein the lumen has an inner diameter equal to or less than 0.0015 inch.

15. The piston assembly of claim 12, wherein the inner tubular member has an outer diameter less than 0.010 inch.

16. The piston assembly of claim 12, wherein the inner tubular member has an outer diameter equal to or less than 0.007 inch.

17. The piston assembly of claim 12, wherein the composite tube has a diameter equal to or less than 0.0200 inch.

18. The piston assembly of claim 12, wherein the composite tube has a length between 0.100 inch and 0.200 inch.

19. The piston assembly of claim 12, wherein the composite tube is press fit into the aperture.

20. The piston assembly of claim 12, wherein the outer tubular member is swaged onto the inner tubular member.

21. The piston assembly of claim 12, wherein the one or more gas bearings comprises a plurality of gas bearings.

22. The piston assembly of claim 21, wherein the plurality of gas bearings are equidistantly disposed around a circumference of the piston.

23. The piston assembly of claim 12, further comprising a unidirectional check valve in communication between the exterior of the piston and the gas cavity.

24. The piston assembly of claim 12, wherein each of the one or more gas bearings further comprises a bearing space formed within the piston, wherein the lumen is in communication with the cylinder bore via the bearing space.

25. A cryocooler, comprising:
    a compressor unit, including
        a piston assembly including a cylinder having a bore, an electrically conductive piston reciprocally disposed within the cylinder bore, a gas cavity formed within the piston, and one or more gas bearings associated with the piston, each of the one or more gas bearings including an aperture formed within the piston and an electrically conductive composite tube extending through the aperture, the composite tube comprising an outer tubular member and an inner tubular member, the inner tubular member having a lumen in communication between the gas cavity and the cylinder bore.
        a magnet ring assembly including a cylindrical magnet holder having an inner surface, and a plurality of magnets disposed around the inner surface of the cylindrical magnet holder, the magnet ring assembly being mounted to the piston bracket; and
        one or more electrical coils that surround an outer surface of the cylindrical magnet holder of the magnet ring assembly;
    a displacer unit in fluid communication with the compressor unit; and
    a heat exchange unit between the compressor unit and displacer unit.

26. The cryocooler of claim 25, wherein the lumen has an inner diameter equal to or less than 0.0020 inch.

27. The cryocooler of claim 25, wherein the lumen has an inner diameter equal to or less than 0.0015 inch.

28. The cryocooler of claim 25, wherein the inner tubular member has an outer diameter less than 0.010 inch.

29. The cryocooler of claim 25, wherein the inner tubular member has an outer diameter equal to or less than 0.007 inch.

30. The cryocooler of claim 25, wherein the composite tube has a diameter equal to or less than 0.0200 inch.

31. The cryocooler of claim 25, wherein the composite tube has a length between 0.100 inch and 0.200 inch.

32. The cryocooler of claim 25, wherein the composite tube is press fit into the aperture.

33. The cryocooler of claim 25, wherein the outer tubular member is swaged onto the inner tubular member.

34. The cryocooler of claim 25, wherein the one or more gas bearings comprises a plurality of gas bearings.

35. The cryocooler of claim 34, wherein the plurality of gas bearings are equidistantly disposed around a circumference of the piston.

36. The cryocooler of claim 25, further comprising a unidirectional check valve in communication between the exterior of the piston and the gas cavity.

37. The cryocooler of claim 25, wherein each of the one or more gas bearings further comprises a bearing space formed within the piston, wherein the lumen is in communication with the cylinder bore via the bearing space.

38. A motor, comprising:
- a piston assembly including a cylinder having a bore, an electrically conductive piston that is reciprocally disposed within the cylinder bore, and a piston bracket disposed on the end of the piston;
- a gas cavity formed within the piston;
- one or more gas bearings associated with the piston, each of the one or more gas bearings including an aperture formed within the piston and an electrically conductive tubular member extending through the aperture, the tubular member having a lumen in communication between the gas cavity and the cylinder bore;
- a magnet ring assembly including a cylindrical magnet holder having an inner surface and an annular ledge formed around the inner surface, and a plurality of magnets disposed around the inner surface of the cylindrical magnet holder, each of the plurality of magnets comprising opposing axial edges, one of the axial edges being disposed on the annular ledge, the magnet ring assembly being mounted to the piston bracket; and
- a magnetic induction assembly operably coupled to the magnet ring assembly.

39. The motor of claim 38, wherein the magnets are equidistantly spaced from each other.

40. The motor of claim 38, wherein each of the plurality of magnets is arcuate.

41. The motor of claim 40, wherein the cylindrical magnet holder has an inner radius, and each of the plurality of magnets comprises an outer radius of curvature substantially equal to the inner radius of the cylindrical magnet holder.

42. The motor of claim 40, wherein each of the plurality of magnets exhibits an outer arcuate length and an inner arcuate length, the inner arcuate length being less than the outer arcuate length.

43. The motor of claim 38, wherein the plurality of magnets has a radially uniform magnetic polarity.

44. The motor of claim 38, wherein the plurality of magnets is bonded to the inner surface of the cylindrical magnet holder.

45. The motor of claim 38, wherein the cylindrical magnet holder comprises a swaged axial edge opposite the annular ledge, and the other of the axial edges of each of the plurality of magnets is captured by the swaged axial edge of the cylindrical magnet holder.

46. The motor of claim 38, wherein the cylindrical magnet holder is composed of a non-magnetic material.

47. The motor of claim 38, wherein the cylindrical magnet holder is a unibody structure.

48. The motor of claim 38, wherein the magnetic induction assembly comprises:
- one or more coils surrounding the piston assembly;
- one or more internal laminations adjacent inner surfaces of the plurality of magnets; and
- one or more external laminations surrounding the one or more coils and being adjacent to the outer surface of the cylindrical magnet holder of the magnet ring assembly.

* * * * *